United States Patent

O'Shea

[15] 3,651,344

[45] Mar. 21, 1972

[54] BALANCED RESAMPLER

[72] Inventor: Thomas Edward O'Shea, Laurence Harbor, N.J.

[73] Assignee: Bell Telephone Laboratories, Incorporated, Murray Hill, N.J.

[22] Filed: Aug. 7, 1970

[21] Appl. No.: 61,935

[52] U.S. Cl. ............................307/270, 330/30 D, 307/243

[51] Int. Cl. .......................................H03k 17/00, 330 30 D

[58] Field of Search ....................307/240, 243, 270; 333/26, 333/25

[56] References Cited

UNITED STATES PATENTS 3,550,040 12/1970 Sinusas ...............................330/30 D 3,523,194 8/1970 Sheng .................................330/30 D 3,541,475 11/1970 Gange et al. ............................333/25

*Primary Examiner*—Donald D. Forrer

*Assistant Examiner*—B. P. Davis

*Attorney*—R. J. Guenther and E. W. Adams, Jr.

[57] ABSTRACT

A circuit comprising two differential amplifiers which are driven by the complementary output of a flip-flop circuit is used to generate a balanced polar binary variable duty cycle signal. Each input to the circuit has emitter-follower transistors for low impedance coupling to enhance switching speed of the differential amplifiers. A resampling signal acts to gate the differential amplifiers simultaneously. A polar binary output signal is obtained from a balun transformer which combines the two outputs that are derived from the two differential amplifiers that operate in such a manner that similar contributions of the feed-through characteristics of the circuit are present in each output.

4 Claims, 4 Drawing Figures

INVENTOR
T. E. O'SHEA
BY David P. Kelley
ATTORNEY

BALANCED RESAMPLER

BACKGROUND OF THE INVENTION

This invention relates to digital transmission systems and, more particularly, to a balanced resampler circuit for use in such systems for converting high-speed unipolar signals into balanced polar binary variable duty cycle signals.

In prior art transmission systems, reactive coupling devices are usually employed to enable powering of the repeater stations of the system by direct-current potential on the transmission line. Furthermore, the signal information is generally transmitted in coded bipolar form to eliminate center line drift which degrades the accuracy of the transmitted information.

In order to make more efficient use of existing transmission cables, faster switching speeds must be utilized to enable transmission of more information within a given time period. Transmission efficiency is also enhanced by direct transmission of the unrestricted random data. In general, prior art transmission systems are unable to transmit unrestricted random signals feasibly and must employ some code translation scheme to prevent the random signals from undesirably causing center line drift. On the other hand, unrestricted transmission of random data can be achieved by methods of equalization and direct current restoration in a quantizing feedback arrangement which is dependent upon precise control of the areas of the polar binary pulse. Such a system calls for accurate high-speed switching to insure the wanted pulse area control.

In prior art high-speed switching circuits, capacitance feed-through currents and modulation of constant current sources undesirably act on the switching pulses to alter their waveform areas. Differences between the positive and negative transitions of such waveforms affect the pulse area and it has generally been assumed in prior art techniques that the rise-and-fall transition characteristics of a transistor are essentially the same. At extremely fast switching speeds, the rise-and-fall transition characteristics of a transistor are not identical. Furthermore, capacitance feed-through currents and intermodulation of the switching circuits are significant unbalancing factors which must be controlled in order to maintain waveform fidelity.

SUMMARY OF THE INVENTION

In an illustrative embodiment of the present invention, two differential amplifiers are each supplied by one of the complementary output channels from a sample-and-hold circuit such as a flip-flop circuit which is driven by a quantizer and gated by the random input data. Each differential amplifier comprises two differentially connected transistors which have their bases connected to emitter-follower transistors. A first collector load resistor is shared by a transistor in each differential amplifier driven through the individual emitter-follower transistors by one of the complementary outputs of the sample and hold circuit. A second collector load resistor is shared by the other transistor in each of the differential amplifiers driven through the appropriate emitter-follower transistors by the other of the complementary outputs of the sample and hold circuit.

Gating action is achieved by resampling pulses that drive two emitter-follower transistors which control a transistor in each of the two differential amplifiers. The first emitter-follower is connected to the base of a transistor in one differential amplifier which is also connected to one of the complementary input channels. The second emitter-follower is connected to the base of a transistor of the other differential amplifier which also is connected to the other complementary channel of the dual input channels.

The circuit arrangement provides two channels of circuitry that are symmetrical with respect to each other. The gating action in both channels produces equivalent feed-through components that are common mode components. For each transition produced by the complementary input signals, there are equivalent switching operations that take place in each channel that act on the switching pulses in the same manner to maintain substantially equal pulse areas in the positive and negative portions of the polar binary signal.

It is a feature of the present invention that a mirror image arrangement of a high-speed switching circuit is used to produce a symmetrical polar binary output signal free from the deficiencies which are characteristic of prior art high-speed switching circuits. This and other features of the present invention will become apparent from the following detailed description, taken in conjunction with the accompanying drawings.

DETAILED DESCRIPTION

Figure 1:
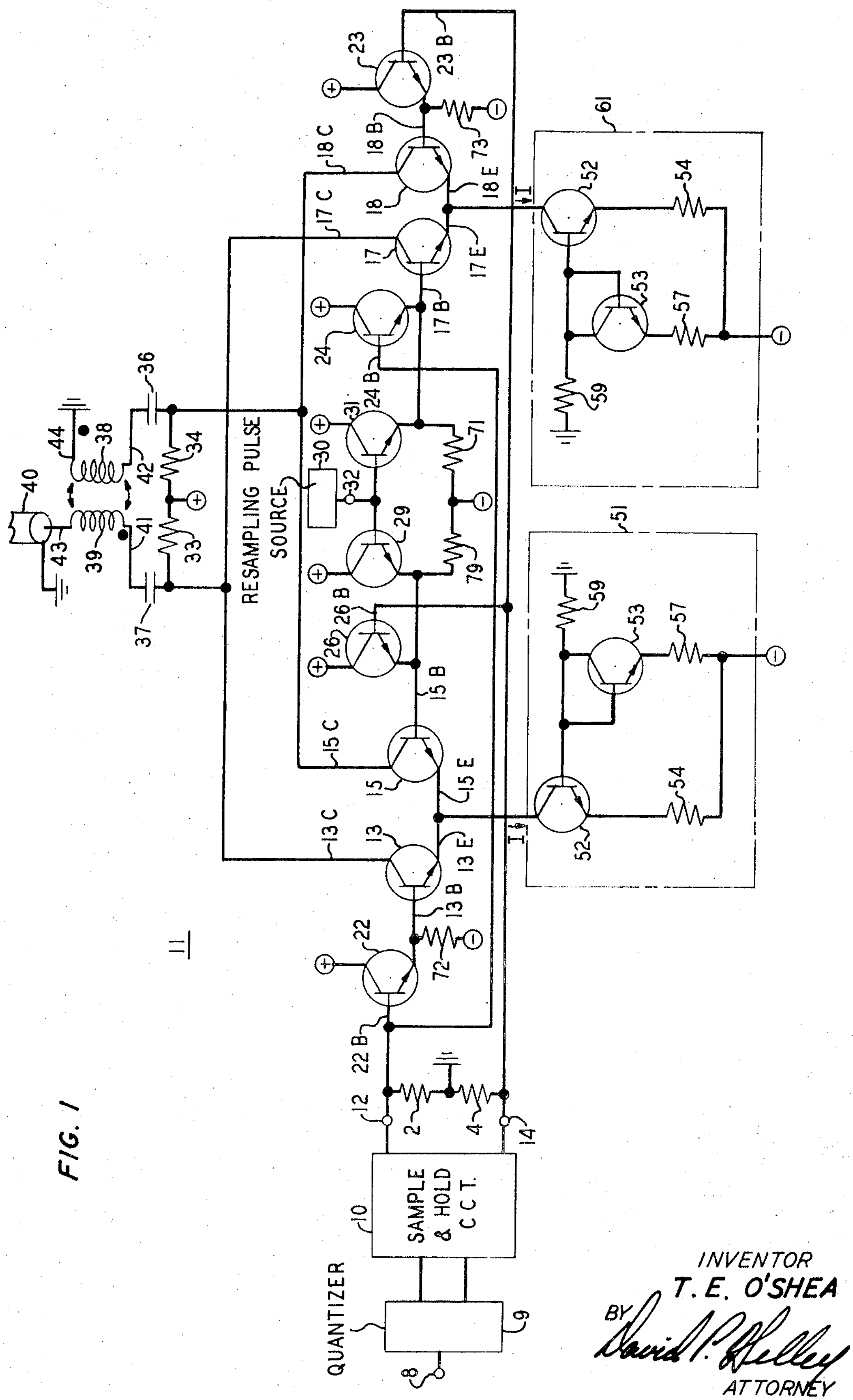
FIG. 1 is a schematic drawing of an embodiment of the invention.

FIG. 1 is a schematic representation of an illustrative embodiment of the present invention. The random input signal is applied to a terminal 8 of the quantizer 9 which drives a sample and hold circuit 10. A first differential amplifier comprises a transistor 13 and a transistor 15 which have their emitter terminals 13E and 15E, respectively, connected to a negative constant current source 51. A second differential amplifier comprises a transistor 17 and a transistor 18 which have their emitter terminals 17E and 18E, respectively, connected to a second negative constant current source 61. The constant current source 51 is identical to the constant current source 61. A positive constant voltage source, not shown in FIG. 1, is connected to the positive terminals as indicated in FIG. 1. A first input channel terminal 12 is connected to one output of a sample and hold circuit 10 and is connected to the base 22B of an emitter-follower transistor 22 and the base 24B of another emitter-follower transistor 24. The emitter of the first emitter-follower transistor 22 is connected to the base terminal 13B of the transistor 13 and the emitter of the second emitter-follower transistor 24 is connected to the base terminal 17B of the transistor 17. A second input channel terminal 14 is connected to a second output of sample and hold circuit 10 and is connected to the base terminal 26B of an emitter-follower transistor 26 and the base terminal 23B of another emitter-follower transistor 23. The arrangement, as shown, produces a complementary set of inputs to the resample circuit from a single data signal input. A resistor 2 is connected to the input terminal 12 and a resistor 4 is connected to the input terminal 14 to provide resistive terminations for their respective input terminals. A source of resampling pulses 30 is connected to an input terminal 32 which is connected to the base of an emitter-follower transistor 29 and another emitter-follower transistor 31, the emitters of which are respectively connected to the base terminal 15B of the transistor 15 and the base terminal 17B of the transistor 17.

Each one of the emitter resistors 72, 79, 71 and 73 are connected, respectively, to the emitter of the transistor 22, the common connection of the emitters of transistors 26 and 29, the common connection of the emitters of transistors 31 and 24, and the emitter of the transistor 23. All of these emitter resistors also have their remaining terminal connected to the negative terminals shown in FIG. 1.

The collector terminal 13C of the transistor 13 is connected to a load resistor 33 which is connected to a positive terminal. The collector terminal 17C of the transistor 17 is also connected to the collector terminal 13C and the load resistor 33. The collector terminal 15C of the transistor 15 is connected to another load resistor 34 which is connected to the positive terminal. The collector terminal 18C of the transistor 18 is also connected to the load resistor 34. A coupling capacitor 37 is connected from the load resistor 33 to a terminal 41 of a winding 39 of a balun transformer. A coupling capacitor 36 is connected from the load resistor 34 to a terminal 42 of the other winding 38 of the balun transformer. The other terminal 44 of the balun transformer winding 38 is connected to ground while the other terminal 43 of the balun transformer winding 39 is connected to the center conductor of a coaxial cable 40.

The negative constant current source 51 comprises a transistor 52 and a transistor 53 which have their bases interconnected along with the collector of the transistor 53 which is also connected to a resistor 59 that is also connected to ground. Emitter-resistors 54 and 57 are connected from the negative terminal to the respective emitters of transistors 52 and 53. A negative constant voltage supply, not shown in FIG. 1, is connected to the negative terminals of the circuit as shown in FIG. 1. The collector terminal of the transistor 52 supplies the emitter current for the first differential amplifier comprising the transistor 13 and the transistor 15. The negative constant current source 61 comprises identical components to that of the constant current source 51 and is connected to the emitter terminals of the second differential amplifier comprising the transistor 17 and the transistor 18.

Figure 2A:
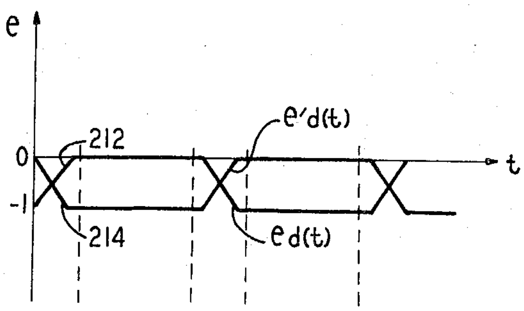
FIGS. 2A, 2B and 2C, respectively, are the dual-channel complementary input signals, the resampling gating pulses, and the symmetrical polar binary output signals of the present invention.

In FIG. 2A is shown the waveform 212 that is applied to the terminal 12 of FIG. 1. The waveform 214 of FIG. 2A is applied to the input terminal 14 of FIG. 1. The waveforms 212 and 214 are complementary signals which may be obtained from the complementary outputs of a flip-flop sample and hold circuit 10, for example.

Figure 2B:
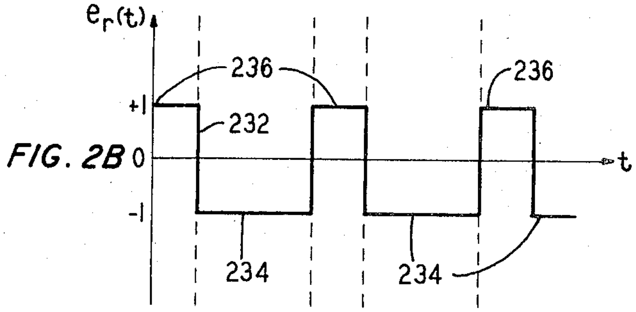

In FIG. 2B are shown the resampling pulses 232 from source 30 which are applied to the terminal 32 of FIG. 1. The negative portion 234 of the resampling pulses of FIG. 2B allows the balanced resampler to evaluate the input signal levels at specific intervals in which the input signals have established values. Therefore, the balanced resampler circuit does not evaluate the input signals while the input signals are undergoing transitions which may not be uniform and which may introduce error into a transmission system. The timing of the resampling pulses relative to the input signals may be achieved by any suitable synchronization means. Thus, for example, the sample and hold circuit 10 and source 30 may be driven by a single timing circuit. The positive portion 236 of the resampling waveform 232 forces the output of the resampler to the center region 240 of the output signal levels, shown in FIG. 2C, periodically between each bit of data information. Therefore, a consecutive series of "1's" or "0's" transmitted through the coaxial cable 40 will occupy the same respective areas as alternate "1's" and "0's".

Figure 2C:
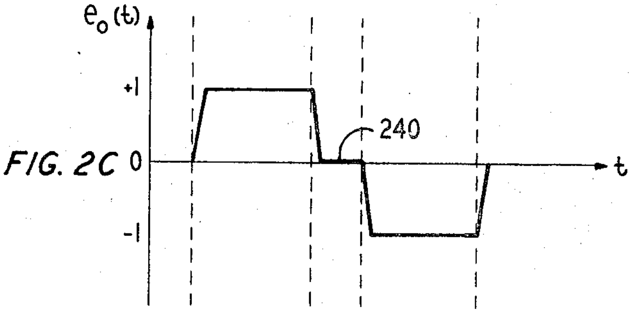

In FIG. 2C the symmetrical polar binary return to zero output signal shown, is transmitted through coaxial cable 40. As can be seen in FIG. 2C, the output signal voltage level is the center region 240 when the resampling pulses 232 are in their positive states 236. When the resampling pulse of FIG. 2B is in the negative state 234, the polarity of the polar binary output signal is determined by the respective voltage levels of the balanced input signals 212 and 214. For a positive polar binary output signal, the terminal 12 of FIG. 1 is at a positive potential with respect to the terminal 14 of FIG. 1. For a negative polar binary output signal, the terminal 12 of FIG. 1 is negative with respect to the terminal 14 of FIG. 1.

In all cases, it is to be understood that the foregoing arrangement is merely illustrative of the many possible applications of the principles of the invention. Numerous and varied other arrangements in accordance with these principles may readily be devised by those skilled in the art without departing from the spirit and scope of the invention.

What is claimed is:

1. A balanced resampler circuit comprising:

a first differential amplifier comprising first and second transistors and a second differential amplifier comprising first and second transistors;

means for producing a complementary set of data channels from a single input data channel, a first data channel of said set being connected to the base of said first transistor of each of said differential amplifiers, and the second data channel of said set being connected to the base of said second transistor of each of said differential amplifiers;

a first current source for supplying a substantially constant current connected to the emitters of said first and second transistors of said first differential amplifier and a second current source for supplying a substantially constant current connected to the emitters of said first and second transistors of said second differential amplifier;

first output means including a first load resistor connected to the collector of said first transistor of each of said differential amplifiers to supply a first output signal;

second output means including a second load resistor connected to the collector of said second transistor of each of said differential amplifiers to supply a second output signal; and means for controlling the intervals for evaluating said data channel inputs connected to both of said differential amplifiers to provide a substantially equal current flow through each of said load resistors between the intervals, said first and second output signals being symmetrical about the voltage level produced by said current between said intervals.

2. The balanced resampler circuit of claim 1 wherein said data channels are connected to the bases of the transistors of said differential amplifiers by means of an emitter-follower transistor for each of said transistors.

3. A balanced resampler circuit comprising:

a first differential amplifier comprising first and second transistors and a second differential amplifier comprising first and second transistors;

means for producing a complementary set of data channels from a single data channel, a first data channel of said set being connected to a first input of said first differential amplifier and a first input of said second differential amplifier, and the second data channel of said set being connected to a second input of said first differential amplifier and a second input of said second differential amplifier;

first output means including a first load resistor connected to said first and second differential amplifiers to supply a first output signal;

second output means including a second load resistor connected to said first and second differential amplifiers to supply a second output signal;

means for producing substantially equal common mode constituents in each signal channel of said output means comprising said first resistor connected to the collectors of said first transistor of each differential amplifier having input means connected to said first data channel, and said second resistor connected to the collectors of said second transistor having input means connected to said second data channel; and means for controlling the intervals for evaluating said data channel inputs connected to both of said differential amplifiers to provide a substantially equal current flow through each of said load resistors between the intervals comprising two emitter-follower transistors supplied by resampling pulses such that the first emitter-follower is connected to a transistor of said first transistor supplied by data from one of said data channels and the second emitter-follower transistor is connected to a transistor of said second differential amplifier supplied by data from the other of said data channels, and said first and second output signals being symmetrical about the voltage level produced by said current between said intervals.

4. The balanced resampler circuit of claim 1 in which means for producing a composite signal for transmission through a coaxial cable comprises a balun transformer having the first terminal of a first winding connected to said first output means, the first terminal of a second winding connected to said second output means, the second terminal of said second winding connected to the outer conductor of said coaxial cable, and the second terminal of said first winding connected to the center conductor of said coaxial cable.